United States Patent
Kim et al.

(10) Patent No.: US 11,154,823 B2
(45) Date of Patent: Oct. 26, 2021

(54) ZEOLITE-COATED MESH FOR OIL-WATER SEPARATION

(71) Applicant: THE BOARD OF REGENTS FOR OKLAHOMA STATE UNIVERSITY, Stillwater, OK (US)

(72) Inventors: Seokjhin Kim, Stillwater, OK (US); Dave Lampert, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 109 days.

(21) Appl. No.: 16/577,405

(22) Filed: Sep. 20, 2019

(65) Prior Publication Data

US 2020/0108354 A1    Apr. 9, 2020

Related U.S. Application Data

(60) Provisional application No. 62/741,749, filed on Oct. 5, 2018.

(51) Int. Cl.
| | | |
|---|---|---|
| *B01D 71/02* | (2006.01) | |
| *B01J 37/02* | (2006.01) | |
| *B01D 67/00* | (2006.01) | |
| *B01D 69/10* | (2006.01) | |
| *B01D 17/00* | (2006.01) | |
| *B01J 29/40* | (2006.01) | |
| *B01D 17/04* | (2006.01) | |
| *B01J 29/42* | (2006.01) | |

(52) U.S. Cl.
CPC ......... *B01D 71/028* (2013.01); *B01D 17/047* (2013.01); *B01D 67/0069* (2013.01); *B01D 69/10* (2013.01); *B01D 71/025* (2013.01); *B01J 37/0246* (2013.01); *B01J 29/40* (2013.01); *B01J 29/42* (2013.01)

(58) Field of Classification Search
CPC .... B01D 17/047; B01D 17/085; B01D 61/14; B01D 67/0051; B01D 67/0069; B01D 69/10; B01D 71/022; B01D 71/025; B01D 71/028; B01J 29/40; B01J 29/42; B01J 37/0246

See application file for complete search history.

(56) References Cited

U.S. PATENT DOCUMENTS

| | | | | |
|---|---|---|---|---|
| 4,578,372 A | | 3/1986 | Hoving et al. | |
| 4,699,892 A | * | 10/1987 | Suzuki | B01D 67/0051 502/4 |
| 5,362,522 A | | 11/1994 | Barri et al. | |
| 7,049,259 B1 | * | 5/2006 | Deckman | B01D 67/0046 502/4 |
| 2005/0014371 A1 | * | 1/2005 | Tsapatsis | C30B 7/005 438/689 |
| 2006/0157397 A1 | | 7/2006 | Yokota | |
| 2008/0282884 A1 | * | 11/2008 | Kelley | B01D 53/02 95/96 |

OTHER PUBLICATIONS

Liu et al., Separation and Purification Technology 195, pp. 163-169 (2018) (Year: 2018).*
Liu et al., Colloids and Surfaces A 550, pp. 108-114 (2018) (Year: 2018).*
Wen et al., Chemical Science, vol. 4, No. 2, pp. 541-864 (2013) (Year: 2013).*
Zeng et al., Colloids and Surfaces A: Physicochem. Eng. Aspects 444, pp. 283-288 (2014) (Year: 2014).*
Jha, B., et al., Chapter 2 Basics of Zeolites, Fly Ash Zeolites, Advanced Structured Materials 78, Springer Science+Business Media Singapore, 2016, pp. 5-31.
Ebrahimi, M., et al., "Characterization and application of different ceramic membranes for the oil-field produced water treatment", Desalination, vol. 245, No. 1-3, Sep. 2009, pp. 533-540.

* cited by examiner

*Primary Examiner* — John Kim
(74) *Attorney, Agent, or Firm* — McAfee & Taft (57) ABSTRACT

A membrane comprising a crystalline material deposited on a porous support. The crystalline material is made of tecto-silicate with a portion of the Si atoms substituted with metal atoms. The membrane is useful in the separation of oil and water.

16 Claims, 11 Drawing Sheets

ZEOLITE-COATED MESH FOR OIL-WATER SEPARATION

CROSS-REFERENCE TO RELATED APPLICATIONS

This application claims the benefit of U.S. Provisional Application No. 62/741,749 filed Oct. 5, 2018, which is hereby incorporated by reference.

FIELD

The present invention relates generally to the separation of oil and water and more specifically, to methods of separating oil and water using membranes.

BACKGROUND

The rapid increase of water demand and severe aggravation of industrial oily water discharge has become a worldwide problem in recent days. The presence of oil not only influences the surroundings, but also damages self-cleaning circulations of the ecological system. Thus, considerable efforts have been afforded to obtain energy-efficient and environmentally-friendly methods in oily contamination treatment. In the past few decades, polymeric membranes have dominated the research and development attention, which exhibit good performance with an oil-rejection rate of more than 95%. However, these polymeric membranes are pressure-driven due to the limited pore size at ultrafiltration level. Although high oil-rejection rates can be realized by polymeric membranes, one of the biggest problems is fouling, which compresses oils on polymeric materials especially under the high-applied pressure. As a consequence, the flux of such membranes will dramatically decline. Despite many researchers' attentions on novel self-cleaning materials for polymeric membranes, the ratios of oil droplets adsorbed on membrane surfaces were still as high as 70%-90% and the ratios of oil droplets cleaned away from membrane surfaces were as low as 30%-40%.

In order to solve the fouling problem, super-hydrophilic polymeric materials have been coated on stainless-steel wire mesh to absorb water passing through the mesh and reject oil simultaneously. The super-hydrophilicity of these materials caused water to form a layer between membrane and oil due to larger density of water that prevented oil permeation. However, polymeric material-coated membranes cannot tolerate corrosive solutions such as acids and bases, high temperatures and organic solvents. Swelling is also a problem prevalent to these materials because of the capillary force or the combination of molecular diffusion and convection in the water-filled pores. This can lead to the critical swelling constraining, which prevents these membranes from being used under severe environmental conditions.

As understood from the above, there is an ongoing interest in and need to develop systems and methods for oil/water separation with high separation performance and which work under severe environmental conditions.

SUMMARY

Embodiments of this disclosure relate to systems and processes for separation of oil and water mixtures. More specifically, the systems utilize a membrane for oil and water separation. The membrane typically comprises a crystalline material deposited on a porous support. The crystalline material is made of tectosilicate with a portion of the Si atoms substituted with substitute atoms selected from the group consisting of Al, B, Ga, Ti, Fe, Cu, V and combinations thereof, and wherein the ratio of substitute atoms to Si atoms in the tectosilicate is in the range from about 0.001 to about 0.1. Optionally, the ratio of substitute atoms to Si atoms can be in the range from 0.01 to 0.07, from 0.02 to 0.06, from 0.03 to 0.05, or can be about 0.04. In embodiments, the crystalline material has an MFI-type framework.

The porous support can be a metal mesh having a mesh size from 50 to 300 U.S. Mesh. In some embodiments, the metal mesh is a stainless steel metal mesh.

In some embodiments, substitute atoms are selected from the group consisting of Al, B and mixtures thereof. In others, the substitute atoms are either Al or B. In still others, the substitute atoms are B and the ratio of B atoms to Si atoms is in the range from 0.01 to 0.07, or can be about 0.04.

The process of this disclosure typically comprises producing one of the above membranes by immersing at least one surface of the porous support in a mixture including silicone atoms and substitute atoms. The porous support is immersed such that the crystalline material crystallizes on the support. The porous support can be immersed vertically and/or slanted or horizontally in the mixture.

The mixture can be produced by adding a silicon compound that degrades in water and a source of substitute atoms into water. The silicon compound can be tetraethyl orthosilicate and the source of substitute atoms can be selected from the group consisting of metal or metalloid sulfates of Al, B, Ga, Ti, Fe, Cu or V, sodium metal oxides or sodium metalloid oxides of Al, B, Ga, Ti, Fe, Cu or V, metal or metalloid nitrates of Al, B, Ga, Ti, Fe, Cu or V, and mixtures thereof.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIG. 6 is a graph illustrating the oil-rejection rate of membranes produced by the In Situ Crystallization Method with Al/Si of 0.04. FIG. 6 illustrates the rate without re-calcination and after re-calcining one, two and three times.

FIG. 9 is a graph showing the oil-rejection rates of membranes produced by the Secondary Growth Method with B/S of 0.04 for various oils.

FIG. 11 is a graph illustrating the oil-rejection rate of membranes produced by the Secondary Growth Method with B/Si of 0.04. FIG. 11 illustrates the rate without re-calcination and after re-calcining one, two and three times.

DETAILED DESCRIPTION

The present disclosure may be understood more readily by reference to this detailed description as well as to the examples included herein. In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

In the description, component ratios will typically be reported as decimals; for example, 1.0 represents a ratio of 1:1 of a first component to a second component, and 0.5 represents a ratio of 1:2 of the first component to the second component. Also, in the description, the term "atoms" may refer to neutrally charged atoms or to ions. Those skilled in the art will realize that generally the crystal structures contained herein will be composed of ions but at times such ions will be referred to herein as atoms.

In one aspect, the present disclosure relates to systems and processes for separation of oil and water mixtures. The systems and processes utilize a membrane for oil and water separation. The membrane typically comprises a crystalline material deposited on a porous support.

The crystalline material is made of tectosilicate with a portion of the Si atoms substituted with metal atoms or metalloid atoms (hereinafter "substitute atoms" or "M")). Tectosilicates are silicates which have a three-dimensional framework of silicate tetrahedra with SiO2. Tectosilicates useful in the systems and processes of this disclosure comprise Na, Si, O and M, where M is a metal or metalloid ion. The tectosilicates have a tetrahedral structure and, somewhat informally, are often referred to as having a zeolite-type structure or as being a zeolite. One particularly useful structure for the systems and processes of this disclosure is $Na_nM_nSi_{96-n}O_{192}$ in an MFI-type framework, where M is a metal or metalloid ion and n is from 1 to 27. While indicated to be a single type of metal or metalloid ion in the formula, M can be ions of one or more suitable metals or metalloids; thus, in some embodiments the formula can be $Na_nM1_pM2_{n-p}Si_{96-n}O_{192}$ (p<n), $Na_nM1_pM2_qM3_{n-p-q}Si_{96-n}O_{192}$ (p+q<n), etc. For example, where M is Al, the tectosilicates having an MFI-type framework is a zeolite known as ZSM-5 and having the formula $Na_nAl_nSi_{96-n}O_{192}$.

Generally, any suitable metal or metalloid that results in a crystalline material having suitable properties for oil and water separation can be used. For example, metals or metalloids selected from the group consisting of Al, B, Ga, Ti, Fe, Cu, V or combinations thereof are beneficial in substituting for a portion of the Si atoms in the crystalline material. More narrowly, the metal or metalloid can be selected from the group consisting of Al, B, Ga, Ti, Fe, Cu and V, and even more narrowly from the group consisting of Al, B and combinations thereof, or can be B. The ratio of metal or metalloid atoms (substitute atoms) to Si atoms in the tectosilicate can be in the range from about 0.001 to about 0.1. More typically, the ratio of substitute atoms to Si atoms can be in the range from 0.01 to 0.07, from 0.02 to 0.06, from 0.03 to 0.05, or can be about 0.04. Thus, for example, in MFI-type framework crystals having a formula of $Na_nM_nSi_{960-n}O_{192}$, n is typically from 1 to 8, or from 1 to 7, or from 2 to 6 or from 3 to 5 or is 4.

The porous support can be any suitable porous support which is not reactive to the conditions used for separation of oil and water and which can suitably retain the crystalline material. It is within the scope of this disclosure to use metal, polymer, composite, carbon or glass meshes for the support. Metal meshes are currently preferred for severe environmental conditions. For example, the mesh can be a stainless steel mesh. The mesh should be sufficient to allow both the drainage of water through the mesh and adequate interaction with the crystalline material such that oil is prevented from passing through the mesh. Generally, the mesh can have a size from about 50 to 300 U.S. Mesh, or a pore size from about 44 microns to about 300 microns. In some embodiments, the mesh size can be from about 70 to about 200 U.S. Mesh or to about 140 U.S. Mesh, or have a pore size of about 74 microns to about 210 microns, or from about 100 microns to about 200 microns.

The above-described membrane can be produced by a process wherein at least one surface of the porous support is immersed in a synthesis solution including silicone atoms and substitute atoms. The porous support is immersed such that the crystalline material crystallizes on the support. Generally, the porous support will be fully immersed in the mixture. In some embodiments, the porous support can be immersed vertically in the mixture, but it is within the scope for the porous support to be immersed horizontally or at a slant.

The synthesis solution can be produced by adding a silicon compound that degrades in water and a source of substitute atoms into water. In some embodiments, the synthesis solution is produced by making a solution of water and a structure-directing agent, such as a base agent like tetrapropylammonium, and then introducing the silicon compound and substitute atom source into the solution. The silicon compound can be tetraethyl orthosilicate or $SiO_2$, for example. The source of metal atoms can be selected metal and metalloids, and more specifically from metal sulfates, metalloid sulfates, sodium metal oxides, sodium metalloid oxides, metal nitrates and metalloid nitrates. For example, metal/metalloid sulfates, sodium metal/metalloid oxides and metal/metalloid nitrates of Al, B, Ga, Ti, Fe, Cu and V can be effective. Suitable metal/metalloid sulfates include: $Al_2(SO_4)_3$, $B_2(SO4)_3$, $Ga_2(SO4)_3$, $Ti_2(SO_4)_3$, $Fe_2(SO_4)_3$, $Cu(SO_4)$ and $VOSO_4$. Suitable sodium metal/metalloid oxides include $NaAlO_2$, $NaBO_2$, $NaGaO_2$, $NaTi_2O_3$, $NaFeO_2$, $NaCuO$ and $Na_3VO_4$. Suitable metal/metalloid nitrates include $Al(NO_3)_3$, $B(NO_3)_3$, $Ga(NO_3)_3$, $Ti(NO_3)_4$, Fe(NO$_3$)$_3$, Cu(NO$_3$)$_2$ and VO(NO$_3$)$_3$. It has been found that boron ions are particularly useful in many embodiments, thus, metalloid atom sources selected from the group consisting of NaBO$_2$, B$_2$(SO4)$_3$, B(NO$_3$)$_3$ and mixtures thereof can be used.

In some embodiments, the porous support is added directly to the above described synthesis solution without any pretreating other than washing or cleaning. In other embodiments, the porous support can first be seeded by immersing it in a seed suspension. The seed suspension is a suitable mixture for inducing the formation of tectosilicate and can be produced using SiO$_2$, for example. After the formation of tectosilicate crystals on the porous support, the support is dried and transferred to the synthesis solution.

The membrane described above can be used in relation to oil and water mixtures to separate the oil and water. "Oil", in relation to oil-water mixtures, refers to any nonpolar chemical substance that is a viscous liquid at ambient temperatures and is both hydrophobic (does not mix with water, literally "water fearing") and lipophilic (mixes with other oils, literally "fat loving").

The separation of oil and water can be carried out by any suitable process which places the oil-water mixture in positive pressure contact with a surface of the membrane. In such positive pressure conditions, the water portion of the mixture will pass through the membrane and the oil portion will be held back by the membrane, or not pass through. For example, the membrane can be positioned horizontally and the oil-water mixture contacted under gravity with an upper surface of the membrane so that water passes down through the membrane and oil is retained above the membrane. Alternatively, the membrane can be positioned vertically and the oil-water mixture pumped into a positive pressure contact with a membrane surface or by gravitational force. As will be appreciated, such membranes generally have two surfaces with a large surface area in comparison with the edges or thickness of the membrane. The positioning of the membrane is described in relation to these two large-area surfaces.

Typically, the membranes of this invention can be used to achieve an oil-rejection rate of greater than 96%, and more typically, an oil-rejection rate of greater than 97%, 98% or 99% can be achieved. In some embodiments, the oil-rejection rate can be greater than 99.5%. For example, the separation of hexane-water mixtures using a membrane having a B-substituted crystalline material, as described above, can achieve an oil reaction rate of 99.5% or greater or of 99.7% or greater.

EXAMPLES

The following examples illustrate specific embodiments consistent with the present disclosure but do not limit the scope of the disclosure or the appended claims. Concentrations and percentages are by weight unless otherwise indicated.

The membranes of the Examples were produced by either the Secondary Growth Method or the In Situ Crystallization Method, both of which are described below.

Membrane Synthesized by Secondary Growth Method

MFI-type crystal-structure membranes were synthesized by a Secondary Growth Method. To prepare MFI seed suspension, NaOH (99.99%, Sigma-Aldrich) was dissolved in the mixture solution of H$_2$O and tetrapropylammonium hydroxide (TPAOH) solution (1 M, Sigma-Aldrich). SiO$_2$ (0.2-0.3 μm powder, Sigma-Aldrich) was added to the above solution gradually at 80° C. in water bath to clear solution with stirring so as to achieve a molar ratio of each component of NaOH:H$_2$O:TPAOH:SiO$_2$=1:131.5:2.86:9.42 respectively. After aging for 4 h, the solution was transferred into hydrothermal vessel and synthesized at 120° C. for 6 h. The synthesized powder was washed in deionized water in a centrifuge until a milky colloid was obtained ("seed suspension").

A pristine stainless steel mesh (100 scale, MSC) was cut into 1 inch×1 inch pieces, and then washed and cleaned with deionized water, ethanol, acetone and deionized water successively and dried at 50° C. overnight. After drying completely, the rinsed mesh was immersed into the seed suspension for 1 min for seeding.

A secondary growth solution (synthesis solution) was prepared by dissolving NaAlO$_2$ (anhydrous, Sigma-Aldrich) into the mixture of water and TPAOH. After stirring for 30 min, tetraethyl orthosilicate (TEOS) (98%, Sigma-Aldrich) was added into the transparent solution dropwise with stirring. The mixture was continuously stirred for 3 more hours. The preparation of the secondary growth solution was designed to result in a molar ratio of each component of TEOS:TPAOH:H$_2$O:NaMO$_2$=1:0.095:35.42:X respectively. Where "M" is a metal or metalloid ion (for these examples Al or B) and the value of X varied from 0 to 0.04, so as to produce crystals with a M/Si ratio (ASR) of from 0 to 0.04.

After drying completely, the seeded mesh was placed vertically into the synthesis solution and synthesized at 150° C. for 17 h. After hydrothermal synthesis, the membrane was calcined as 550° C. for 6 h at the temperature increasing and decreasing rate of 30° C./h.

Membrane Synthesized by In Situ Crystallization Method

MFI-type crystal-structure membranes were synthesized by an In Situ Crystallization Method. The synthesis solution for in situ crystallization was prepared following the same procedures as described above for the Secondary Growth Method, while the molar ratio of each component was TEOS:TPAOH:H$_2$O:NaMO$_2$=1:0.095:35.42:X. Where "M" is the metal or metalloid ion (only NaAlO$_2$ was used for the in situ crystallization method for the below examples) and the value of X varied from 0 or 0.04 respectively. The pristine stainless steel mesh was rinsed with same treatments as described. After drying completely, the mesh was immersed into the synthesis solution directly without seeding. The hydrothermal synthesis was operated at 150° C. for 17 h. After hydrothermal synthesis, the membrane was dried and calcined at 550° C. for 6 h with the ramping rate of 30° C./h.

Example 1

Zeolite membranes were prepared in accordance with the Secondary Growth Method and In Situ Crystallization method. NaAlO$_2$ was used to prepare the synthesis solution. The zeolite membranes were prepared by the Secondary Growth Method so as to have Al/Si ratios of 0, 0.01, 0.02 and 0.04. The zeolite membranes were prepared in accordance with the In Situ Crystallization Method so as to have Al/Si ratios of either 0 or 0.04.

The membranes were tested to determine their oil/water separation capabilities by the following method. A synthesized membrane was fixed between two polytetrafluoroethylene sheets (marketed under the brand name Teflon) and sealed by epoxy resin. Before the separation test, 20 mL of deionized water was poured one time on top of the zeolite meshes for pre-wetting. Afterwards, the oil/water separation was performed immediately. A bottle was put on the top of the membrane and then an oil/water mixture (50% v/v, 40 mL) was poured into the bottle, and the filtration occurred with gravity as the driving force. The separation efficiency was defined and calculated by the oil-rejection rate η according to the following equation:

$$\eta = 1 - \frac{m_i}{m_0}$$

where $m_i$ is the weight of the oil passed through the membrane; $m_0$ is the total weight of the oil before separation. The permeation flux J was calculated as:

$$J = \frac{W}{A \times t}$$

where W is the weight of permeate; A is the effective membrane area; t is the permeant time.

The oil/water mixture (50% v/v) was poured into the zeolite membrane. Water quickly passed through the mesh, meanwhile the oil was repelled on the mesh. The required time for separation of 40 ml of oil/water mixture was around 5-10 s, depending on the Al/Si ratio of the zeolite mesh.

To examine membrane stability, filtrations were repeated several times successively for each membrane without further wetting and cleaning unless mentioned otherwise. The membrane performance was investigated by comparing oil-rejection rates. In order to reproduce the membrane, the tested membranes were placed into an oven and calcined at 550° C. for 6 h at the temperature increasing and decreasing rate of 30° C./h, which was repeated three times. The performance of the re-calcined membrane was measured following the same procedures described above.

Four kinds of oils and organic solvents were used in this Example 1: hexane, cyclohexane, crude oil and vegetable oil. They were colored with Sudan Red. In Example 1, hexane was used as the oil unless otherwise indicated.

Figure 1:
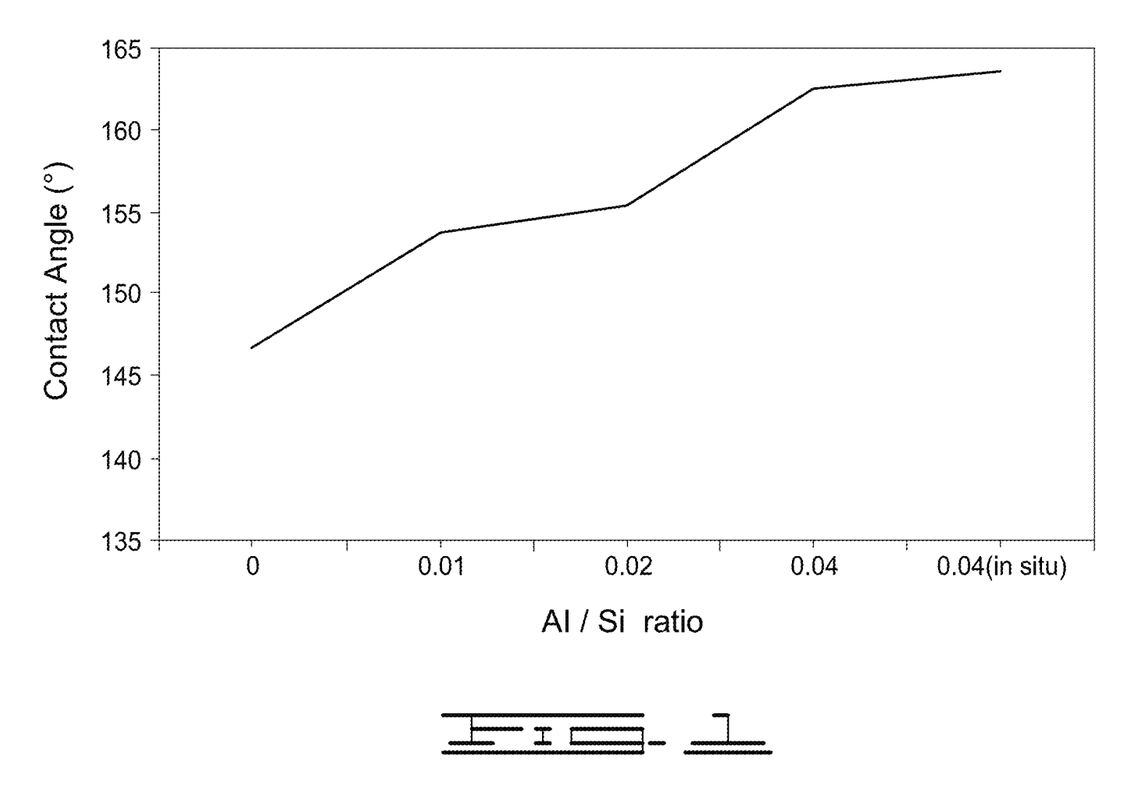
FIG. 1 is a graph illustrating the wettability of membranes produced by the Secondary Growth Method and In Situ Crystallization Method, and showing increasing underwater super-oleophobicity as a function of Al/Si ratio.

Initially, hexane was used to test the wettability of the zeolite-coated meshes. Wettability was determined by contact angle measurement. An increased amount of $Al^{3+}$ ions raised the contact angle between hexane droplet and zeolite-coated mesh, showing that underwater super-oleophobic materials were obtained (FIG. 1). When the Al/Si ratio reached 0.04, the oil contact angle was 163.5°, indicating the possible formation of water layer between the hexane droplet and zeolite-coated mesh. The water layer could be firmly held by zeolite crystal through hydrogen bonding, which resulted in the repulsive properties to oil and the high oil-rejection rate. Thus, the oil-adhesion of the surface became lower with increasing Al/Si ratios from 0 to 0.04. Contact angles were measured for in situ and secondary grown MFI membranes, respectively. As shown in FIG. 1, the oil contact angles of in situ MFI membranes were higher than secondary grown membranes, which shows higher hydrophilicity of in situ membrane.

Figure 2:
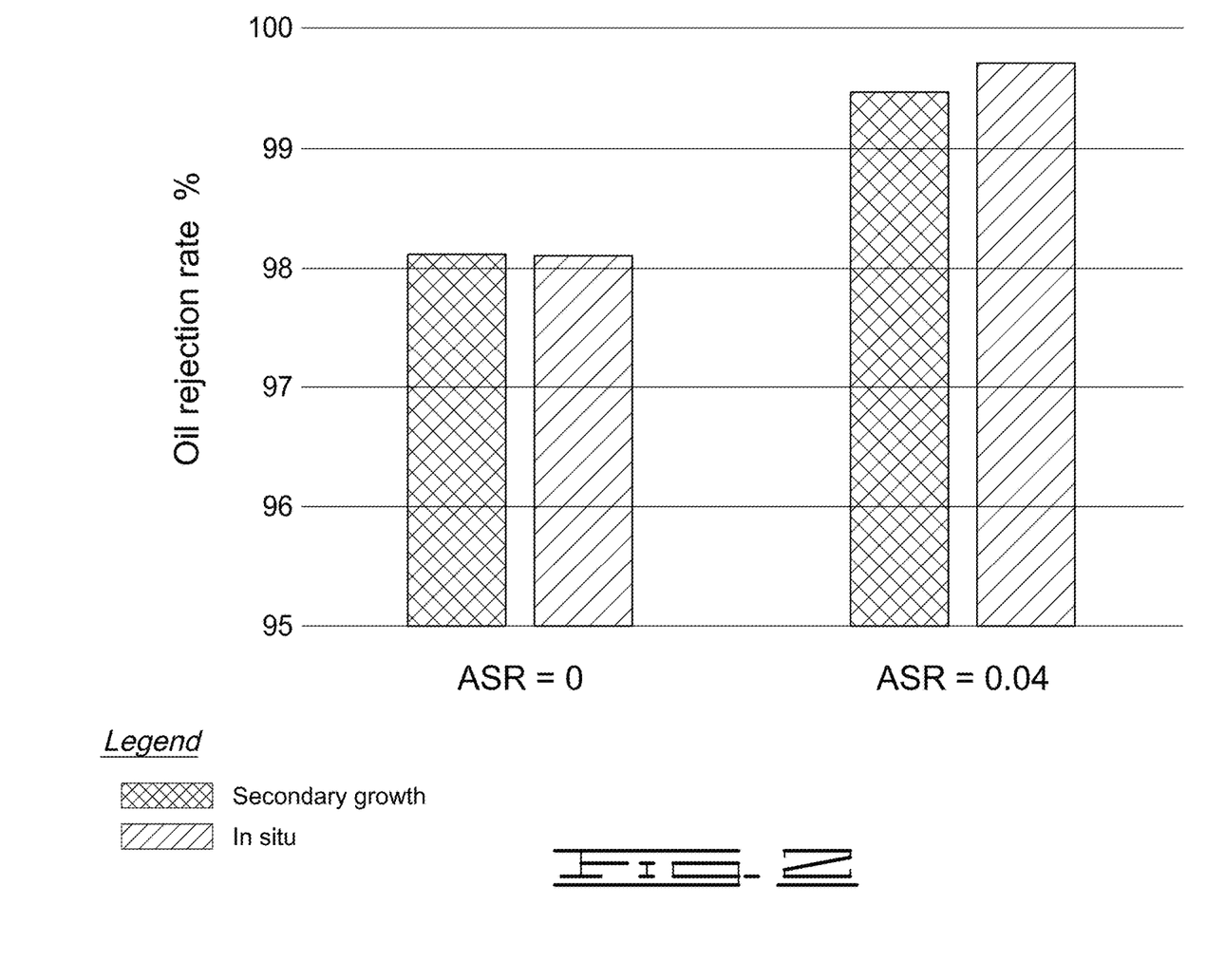
FIG. 2 is a graph comparing membranes produced by the Secondary Growth Method and produced by the In Situ Crystallization Method. The graph shows oil-rejection rates for hexane-water mixtures for membranes with an Al/Si ratio of 0 and an Al/Si ratio of 0.04 Al/Si.

Next, the oil-rejection rate for hexane/water mixture was used to determine the oil-rejection rate for membranes produced by the Secondary Growth Method and by the In Situ Crystallization Method. FIG. 2 shows a comparison of oil-rejection rate of in situ and secondary grown MFI membranes with two different Al/Si ratios (0 and 0.04). The oil-rejection rates of in situ membranes were slightly higher than that of secondary grown membranes under the same oil/water separation ambient conditions. While not wishing to be bound by theory, this may be due to the relatively rougher surface of the in situ synthesized zeolite-coated mesh, wherein the larger surface area contributed to higher interactions between coated zeolite layer and water. In this case, water was held more firmly by the zeolite crystal layer to obtain higher oil-rejection rates. FIG. 2 shows the in situ synthesis of the zeolite-coated mesh can be applied to save chemicals and time and thus provide a resource-saving alternative way to synthesize the MFI zeolite mesh without loss of membrane performance.

Figure 3:
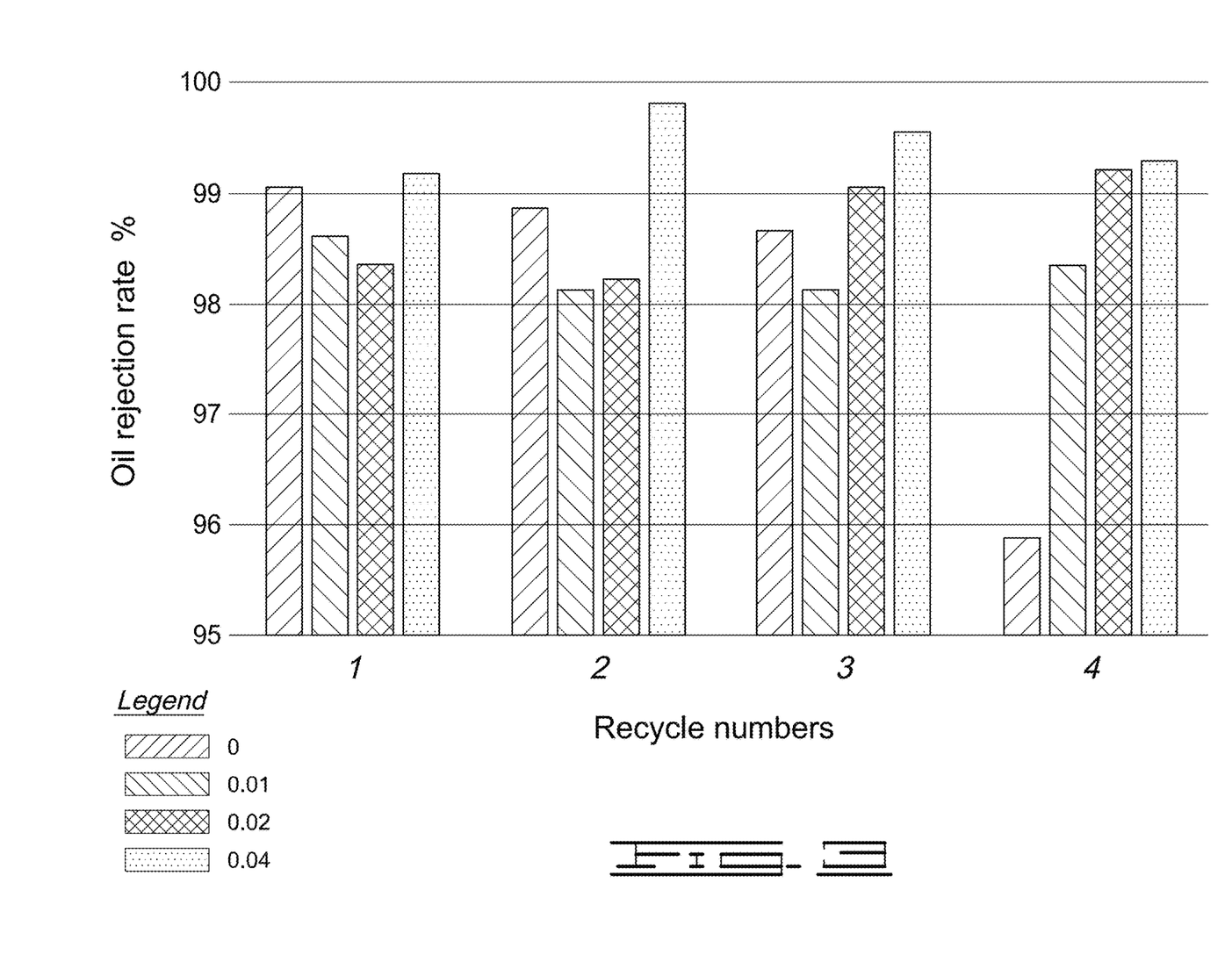
FIG. 3 is a graph illustrating the oil-rejection rate as a function of Al/Si ratio for membranes produced by the Secondary Growth Method.

FIG. 3 illustrates the oil/water separation efficiency as a function of Al/Si ratio for the membranes produced by the Secondary Growth Method. As can be seen from FIG. 3, the oil-rejection rate increased with increasing Al/Si ratios. This clearly indicates the membranes with higher Al/Si ratio are more hydrophilic.

Figure 4:
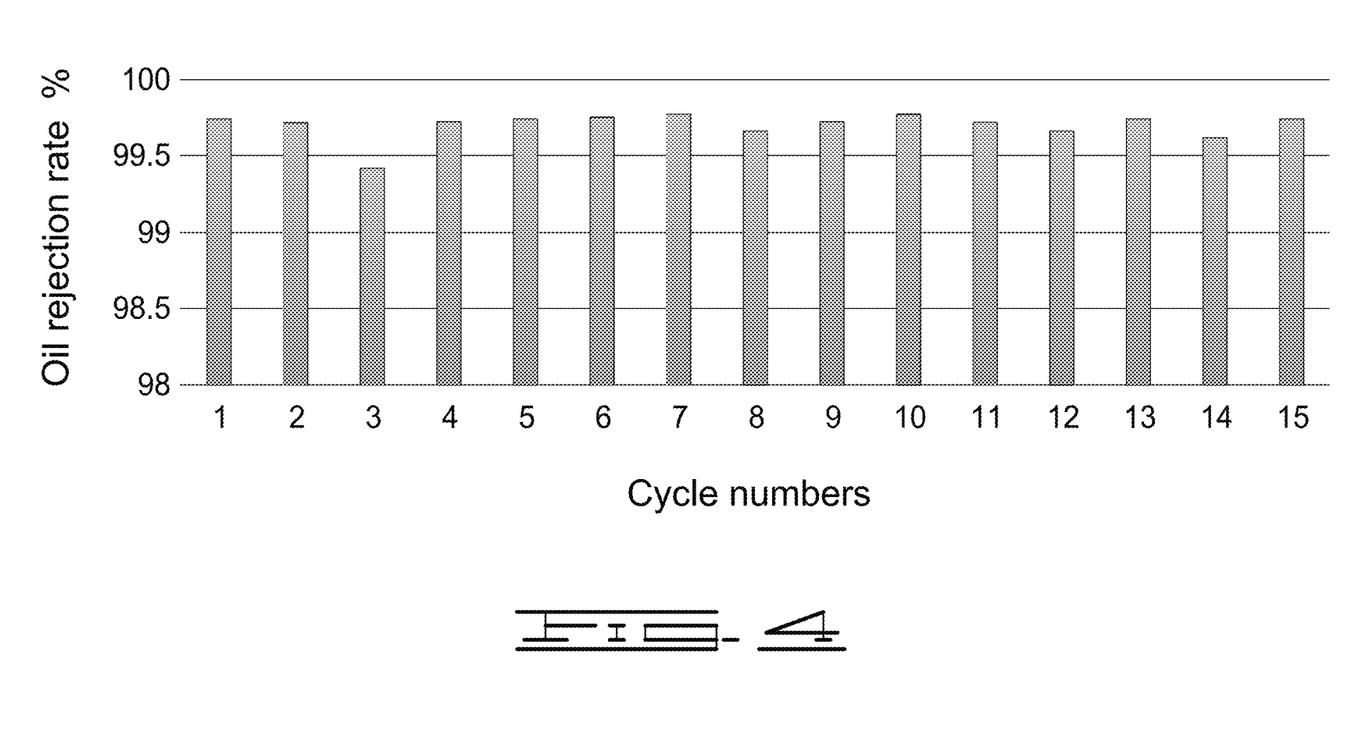
FIG. 4 is a graph showing the oil-rejection rate of membranes produced by the In Situ Crystallization Method with Al/Si of 0.04 for 15 separation cycles.

The stability of a zeolite-type mesh is one of the most important aspects for industrial applications. To examine the stability, the prepared membranes underwent multiple separation cycles. FIG. 4 shows the oil-rejection rate of the in situ synthesized mesh with Al/Si=0.04 for 15 separation cycles, which were performed for ~3 h with 10 min break between each separation cycle. The oil/water separation was finished within 10 s for each cycle. During 15 separation cycles, the oil-rejection rates were above 96% with the average value of 99.7%. These results strongly indicate the good stability of the membrane.

Figure 5:
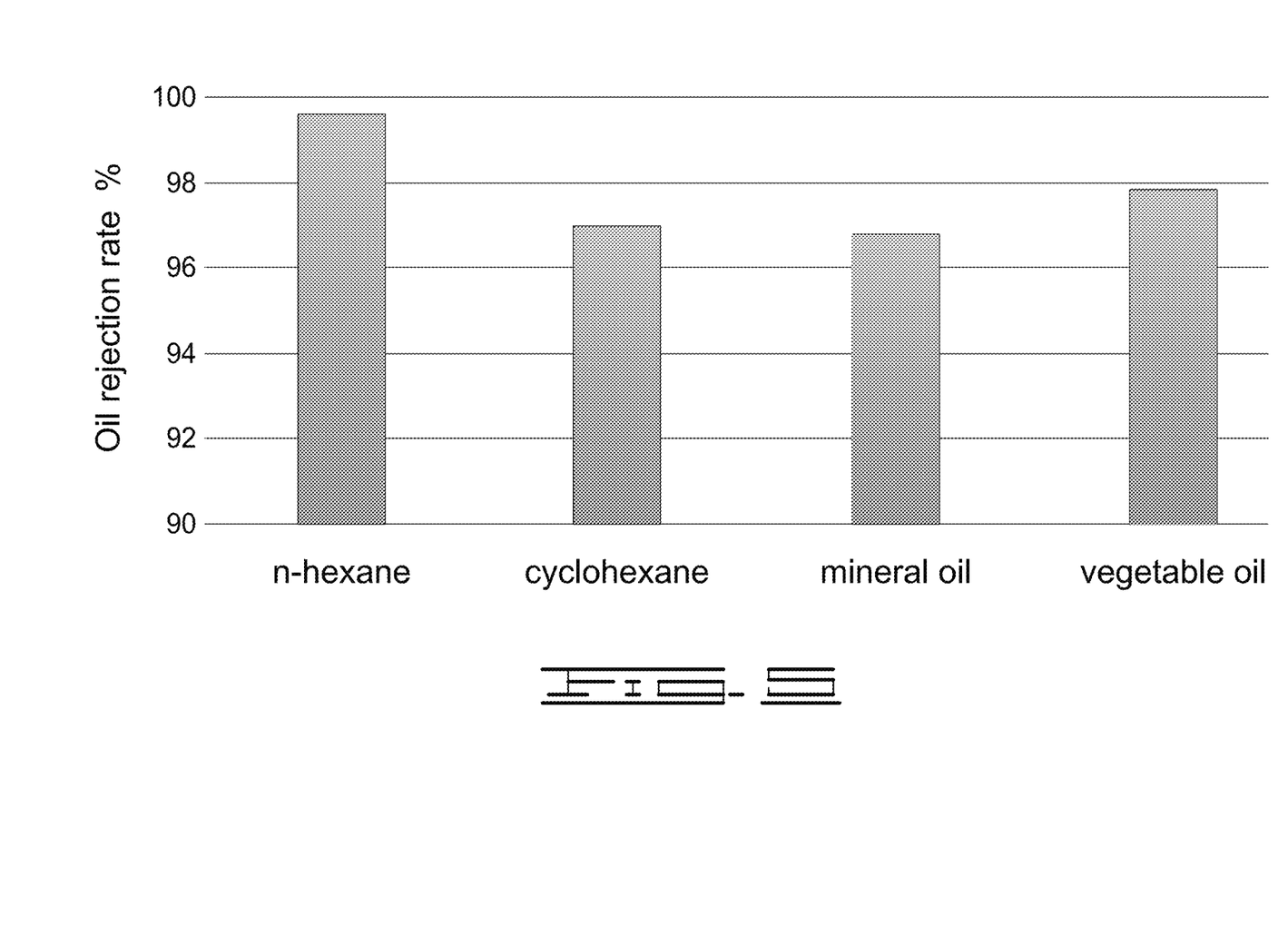
FIG. 5 is a graph showing the oil-rejection rates of membranes produced by the In Situ Crystallization Method with Al/Si of 0.04 for various oils.

To further evaluate the separation capability of the zeolite-coated mesh, FIG. 5 shows the separation ability of the zeolite-coated mesh for various oils and organic solvents. The in situ synthesized zeolite-coated mesh with Al/Si=0.04 was selected, which resulted in oil-rejection above 96% for n-hexane, cyclohexane, mineral oil, and vegetable oil. It was found that the prepared hydrophilic zeolite mesh showed great potential for future industrial production.

Furthermore, a very important property of a zeolite mesh is reusability. The reusability of zeolite mesh was investigated via re-calcination processes. After oil/water separations, the zeolite-coated mesh film was re-calcined in the oven at 550° C. for 6 h with the heat ramping rate of 30° C./h in stagnant air. As shown in FIG. 6, oil-rejection rates of the re-calcined membranes were >98.8% during 15 separation cycles. After each of three re-calcinations, the average oil-rejection rate during 15 separation cycles can still reach 99.5%, 99.7% and 99.6% respectively. This can be compared with the oil-rejection rate of the pristine membrane (99.7%). The results indicate the membrane performance is thermally stable. The re-calcination step provides a simple way to regenerate the used zeolite-mesh membranes. This can save the expensive chemicals and save the membrane synthesis time. These results indicate the good reusability and good recyclability of the MFI zeolite mesh.

Example 2

Zeolite membranes were prepared in accordance with the Secondary Growth Method. $NaBO_2$ was used to prepare the synthesis solution. The zeolite membranes were prepared having B/Si ratios of 0, 0.01, 0.02 and 0.04.

The membranes were tested as outlined above in Example 1 to determine their oil/water separation capabilities. To examine membrane stability, filtrations were repeated several times successively for each membrane without further wetting and cleaning unless mentioned otherwise. The membrane performance was investigated by comparing oil-rejection rates. The corrosive solutions were prepared by mixing 1 mol/L NaOH solution, 1 mol/L HCl solution or hot water at 60° C. with hexane respectively. In order to reproduce the membrane, the tested membranes were placed into an oven and calcined at 550° C. for 6 h at the temperature increasing and decreasing rate of 30° C./h, which was repeated three times. The performance of the re-calcined membrane was measured following the same procedures described above.

Four kinds of oils and organic solvents were used in this Example 2: hexane, cyclohexane, crude oil and vegetable oil. They were colored with Sudan Red. In Example 2, hexane was used as oil unless otherwise indicated.

Figure 7:
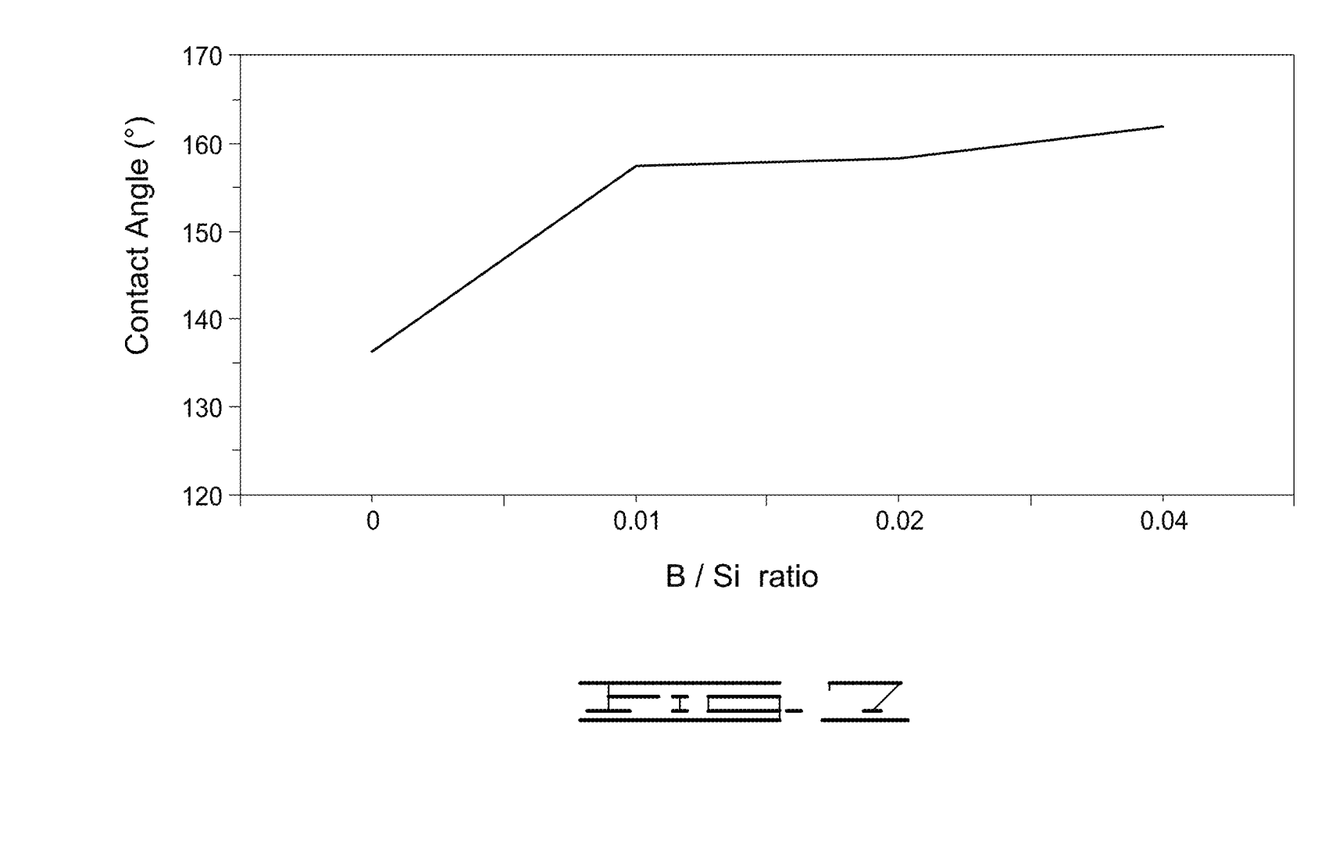
FIG. 7 is a graph illustrating the wettability of membranes produced by the Secondary Growth Method and showing increasing underwater super-oleophobicity as a function of B/Si ratio.

Initially, hexane was used to test the wettability of the zeolite-coated meshes. Wettability was determined by contact angle measurement. The $B^{3+}$ ions increased the contact angle between hexane droplet and zeolite-coated mesh, showing underwater super-oleophobic materials were obtained (FIG. 7). The highest oil contact angle of 162.0° was obtained at B/Si=0.04. Thus, the oil-adhesion of the surface became lower with increasing B/Si ratios from 0 to 0.04.

Figure 8:
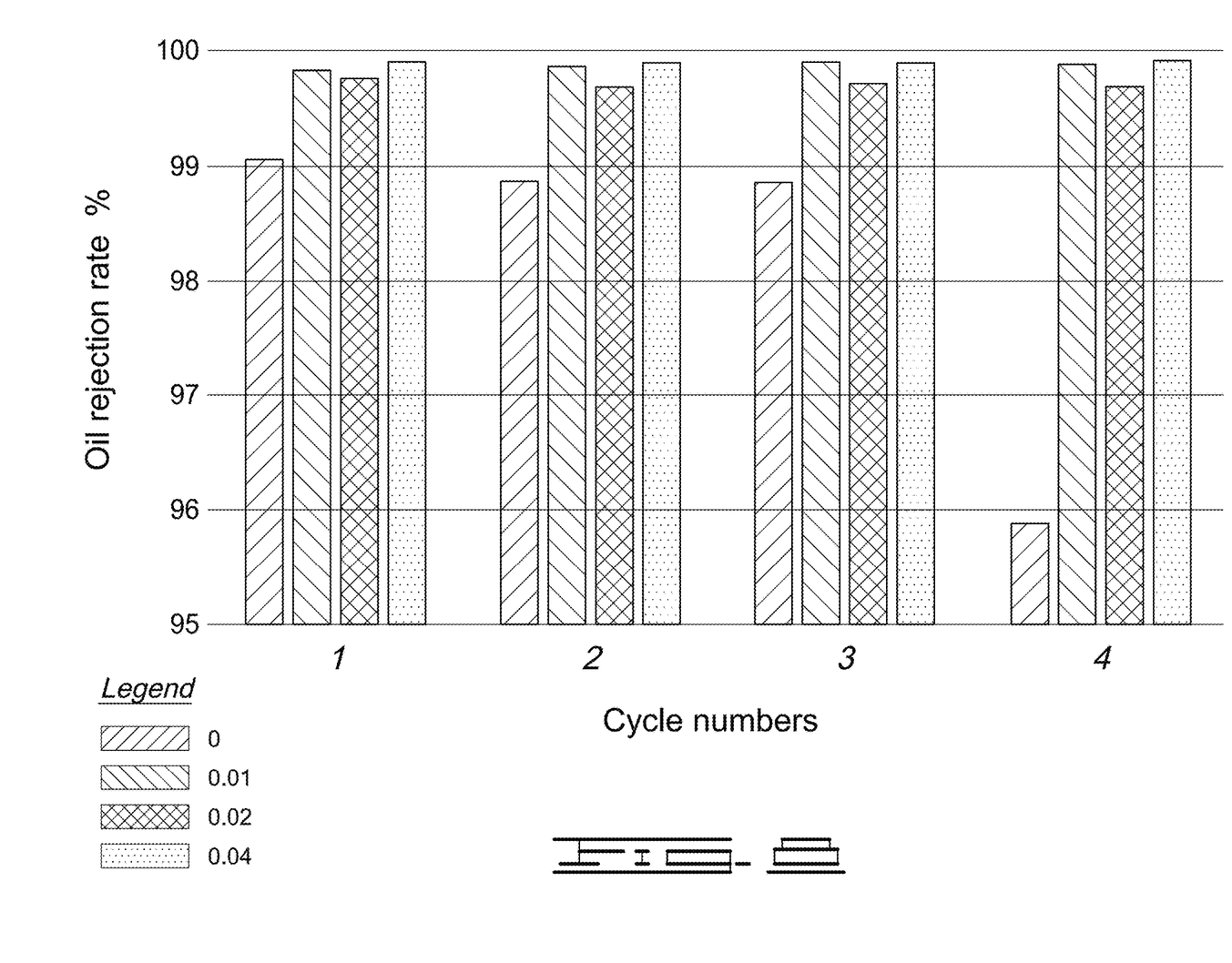
FIG. 8 is a graph illustrating the oil-rejection rate as a function of B/Si ratio for membranes produced by the Secondary Growth Method. The data is illustrated through 4 cycles.

FIG. 8 illustrates the oil/water separation efficiency of four different B/Si ratio membranes (0, 0.01, 0.02 and 0.04). Each membrane was tested through 4 cycles. As shown in FIG. 8, the oil-rejection rate of the zeolite-coated mesh without boron (B/Si=0) decreased with increasing separation cycle numbers, which reflected that the boron-less zeolite-coated meshes are less stable. Once the boron was introduced into the zeolite structure (B/Si=0.01, 0.02 and 0.04), the oil-rejection rates increased to over 99.5% with the water flux of 14,209-28,418 $L\ m^{-2}\ h^{-1}$ depending on the different B/Si ratios with their high stabilities compared to boron-less mesh.

When compared with various hydrophilic materials-coated meshes (Table 1), the boron-introduced zeolite-coated mesh showed better performance at each B/Si ratios. Additionally, the boron-introduced zeolite-coated meshes show higher oil-rejection rates than aluminum-introduced zeolite-coated meshes of Example 1.

TABLE 1

| Inorganic hydrophilic materials | Hexane rejection rate |
| --- | --- |
| MFI-Zeolite | 96-98% |
| $Cu_2S$ | >99% |
| $SiO_2$ | 97.5% |
| $SiO_2$ | >90% |
| $TiO_2$ | 94% |
| ZnO | >95% |
| Palygorskite | >96% |
| Boron-introduced zeolite | >99% |

FIG. 9 shows the separation ability of the zeolite-coated mesh for various oils and organic solvents. The boron-introduced zeolite-coated mesh with B/Si=0.04 showed oil-rejection above 96.9% for n-hexane, cyclohexane, mineral oil, and vegetable oil. It was found that the prepared hydrophilic zeolite mesh can separate water from various types of organic solvents effectively. Since most of the oils or organic solvents are insoluble in water, the various oil rejection results demonstrated great potential of the boron-introduced zeolite-coated mesh for future industrial applications in two-phase oily-water separation. To further evaluate the separation capability, the intrusion pressure of the mesh (B/Si=0.04) was measured. The maximum stable supporting height of hexane was 12.2 cm, indicating the intrusion pressure of the mesh can reach 0.96 kPa. The intrusion pressure measurement showed the solid mechanical strength of the boron-introduced zeolite-coated meshes, and their potential to be treated with large amount of oil/water mixture at one time.

Figure 10:
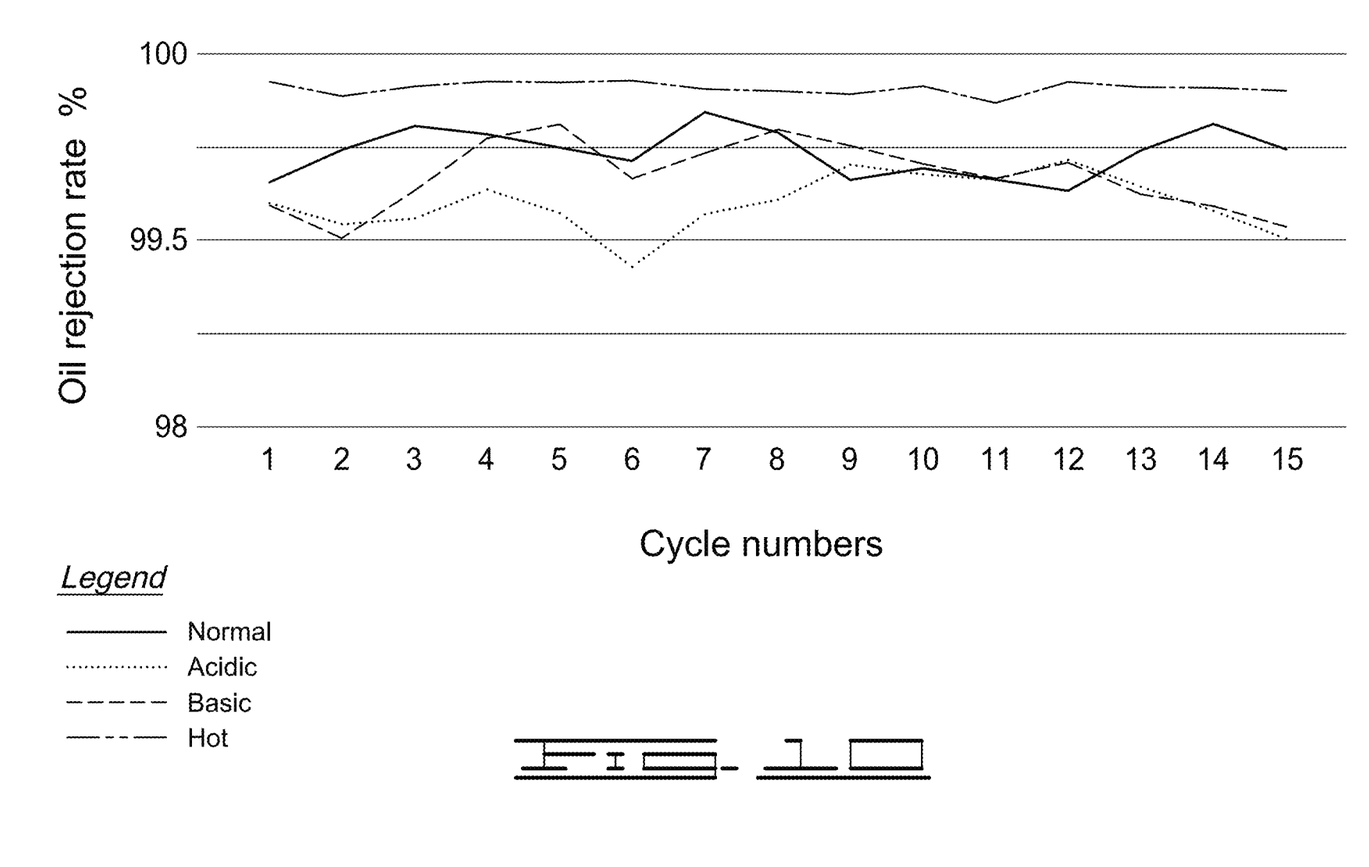
FIG. 10 is a graph illustrating oil-rejection rate of boron-introduced zeolite-coated mesh with B/Si of 0.04 under normal, acidic, basic and hot separation processes.

The stability of a zeolite mesh is required for sustainable industrial applications. The boron-introduced zeolite-coated mesh was examined in order to separate corrosive and hot oil/water mixtures in multiple separation cycles. The boron-introduced zeolite-coated mesh with B/Si=0.04 was tested under acidic, basic, and hot media. As shown in FIG. 10, compared with the normal cases, when the zeolite-coated mesh was treated with acid or base respectively, the oil-rejection rates showed little deviation less than 0.2% during multiple cycles. The hot water/hexane mixture had nearly no effects on oil-rejection rate. The oil-rejection rates were higher than 99.4% in these four cases, indicating zeolite-coated mesh performance was not greatly affected when treated with the corrosive or hot aqueous solutions. SEM images were taken before and after corrosive and hot solutions. Some small crystals were observed on the corrosive media treated mesh compared with the pristine one. However, the main structures of the coated zeolite were not significantly damaged compared with the pristine one, which indicated the excellent resistance of our boron-introduced zeolite-coated mesh towards acidic, basic, and hot media. It was found that the zeolite crystal structures were not obviously changed and the super-hydrophilicity remained with high performance of oil/water separation. Thus, the results indicate the zeolite-coated mesh could be used under severe conditions.

Figure 11:
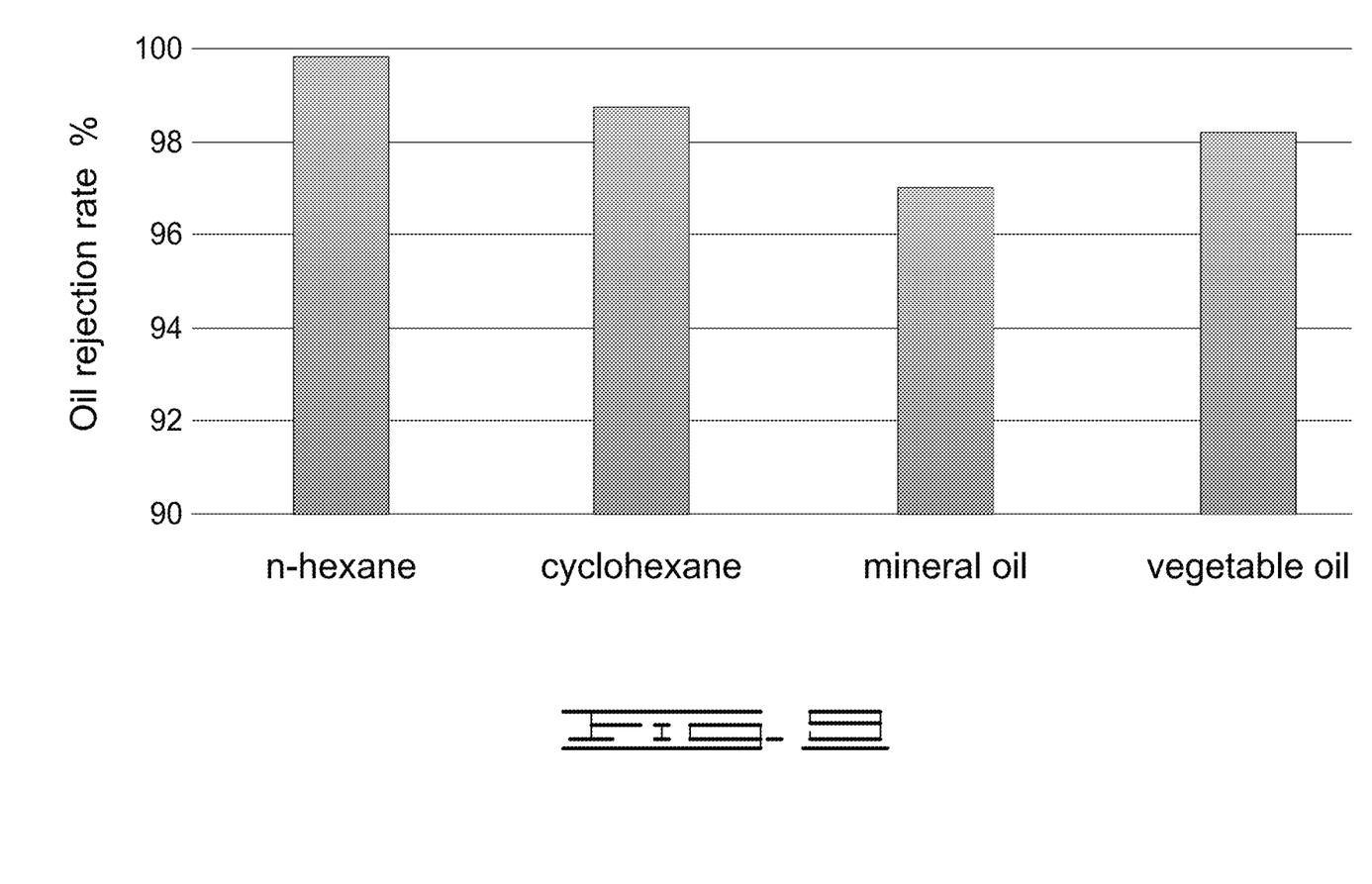

The reusability of zeolite mesh was investigated via re-calcination processes. After oil/water separations, the zeolite-coated mesh film was re-calcined in the oven at 550° C. for 6 h with the heat ramping rate of 30° C./h. As shown in FIG. 11, oil-rejection rates of the re-calcined membranes were >98.8% during 15 separation cycles. After re-calcinations for three times, the average oil-rejection rate during 15 separation cycles can still reach 99.5%, 99.7% and 99.6% respectively. This can be compared with the oil-rejection rate of the pristine membrane (99.7%). The results indicate the membrane performance is thermally stable. The re-calcination step provides a simple way to regenerate the used zeolite-mesh membranes. This can save the expensive chemicals and save the membrane synthesis time. These results indicate the good reusability and good recyclability of the MFI zeolite mesh.

As can be seen from the above example, the membranes of this disclosure have high separation performance for oil and water mixtures and have high water flux. Additionally, the membranes are stable, allow for regeneration while retaining good performance, and work under severe environmental conditions.

Therefore, the present compositions and methods are well adapted to attain the ends and advantages mentioned, as well as those inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A membrane for oil water separation, the membrane comprising:
   a porous support; and
   a crystalline material deposited on the porous support; the crystalline material is made of tectosilicate with a portion of the Si atoms substituted with substitute atoms, wherein the substitute atoms are B atoms, and wherein the ratio of substitute atoms to Si atoms in the tectosilicate is from about 0.001 to about 0.1.

2. The membrane of claim 1, wherein the crystalline material has an MFI-type framework.

3. The membrane of claim 1, wherein the ratio of substitute atoms to Si atoms is from 0.01 to 0.07.

4. The membrane of claim 1, wherein the ratio of substitute atoms to Si atoms is from 0.02 to 0.06.

5. The membrane of claim 1, wherein the ratio of substitute atoms to Si atoms is from 0.03 to 0.05.

6. The membrane of claim 1, wherein the ratio of substitute atoms to Si atoms is about 0.04.

7. The membrane of claim 1, wherein the porous support is a metal mesh having a mesh size from 50 to 300.

8. The membrane of claim 7, wherein the metal mesh is a stainless steel metal mesh.

9. The membrane of claim 7, wherein the ratio of B atoms to Si atoms is from 0.01 to 0.07.

10. The membrane of claim 9, wherein the crystalline material has an MFI-type framework.

11. The membrane of claim 10, wherein the ratio of B atoms to Si atoms is about 0.04.

12. A process for the production of a membrane comprising a crystalline material deposited on a porous support, the process comprising:
    immersing at least one surface of the porous support in a mixture including silicone atoms and substitute atoms, wherein the porous support is immersed such that the crystalline material crystallizes on the porous support such that the crystalline material is made of tectosilicate with a portion of the Si atoms substituted with substitute atoms, wherein the substitute atoms are B atoms, and wherein the ratio of substitute atoms to Si atoms in the tectosilicate is from about 0.001 to about 0.1.

13. The process of claim 12, wherein the mixture is produced by adding a silicon compound that degrades in water and a source of substitute atoms into water.

14. The process of claim 13, wherein the silicon compound is tetraethyl orthosilicate and the source of substitute atoms is selected from the group consisting of metal or metalloid sulfates of B, sodium metal oxides or sodium metalloid oxides of B, metal or metalloid nitrates of B, and mixtures thereof.

15. The process of claim 14, wherein the ratio of substitute atoms to Si atoms is from 0.01 to 0.07, and the porous support is a metal mesh having a mesh size from 50 to 300.

16. The process of claim 15, wherein the ratio of substitute atoms to Si atoms is from 0.03 to 0.05.

* * * * *

UNITED STATES PATENT AND TRADEMARK OFFICE
CERTIFICATE OF CORRECTION

PATENT NO. : 11,154,823 B2
APPLICATION NO. : 16/577405
DATED : October 26, 2021
INVENTOR(S) : Seokjhin Kim et al.

Page 1 of 1

It is certified that error appears in the above-identified patent and that said Letters Patent is hereby corrected as shown below:

In the Specification

Column 4, Line 19, replace "$Na_nM_nSi_{960-n}O_{192}$" with --$Na_nM_nSi_{96-n}O_{192}$--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*